UNITED STATES PATENT OFFICE.

RENÉ BOHN, OF LUDWIGSHAFEN-ON-THE-RHINE, BAVARIA, ASSIGNOR TO THE BADISCHE ANILIN AND SODA FABRIK, OF MANNHEIM, GERMANY.

MANUFACTURE OF YELLOW COLORING-MATTER OR DYE-STUFF FROM GALLIC ACID.

SPECIFICATION forming part of Letters Patent No. 348,613, dated September 7, 1886.

Application filed June 17, 1886. Serial No. 205,458. (Specimens.)

*To all whom it may concern:*

Be it known that I, RENÉ BOHN, a citizen of Switzerland, residing at Ludwigshafen-on-the-Rhine, in the Kingdom of Bavaria and Empire of Germany, have invented new and useful Improvements in the Manufacture of a Yellow Coloring-Matter or Dye-Stuff from Gallic Acid, of which the following is a specification.

This invention relates to a yellow dye-stuff or coloring-matter, which hereinafter shall be termed "galloflavine," and which is produced by the oxidizing action of atmospheric air or of oxygen upon alkaline solutions of gallic acid.

To carry out my invention I proceed as follows: Five parts, by weight, of gallic acid are dissolved in eighty parts, by weight, of strong alcohol and one hundred parts of water. The solution thus obtained is cooled down to a temperature ranging between 5° and 10° centigrade, and under constant agitation about seventeen parts, by weight, of caustic potash liquor of about 1.26 specific gravity are gradually added. The alkaline solution is then exposed to the action of atmospheric air at a temperature not exceeding 10° centigrade. For this purpose a strong current of air may be passed through the alkaline solution, or properly-constructed apparatus or agitators may be employed, which will cause the surface of the solution to get continuously renewed, and fresh portions of the same to get gradually exposed to the access of air. The progress of the oxidation will soon be rendered apparent by the olive or brownish green color of the solution, gradually increasing in intensity, and after some time a crystalline precipitate—the potassium salt of the new coloring-matter—will begin to settle out.

In order to ascertain the point at which the production of galloflavine has reached its maximum the following test is to be applied: From time to time a sample is to be withdrawn and filtered. The filtered liquor is then to be shaken up with air and examined whether after some time it will contain a precipitate, which refuses to dissolve in dilute hydrochloric acid. If the said precipitate ceases to be produced, the operation ought to be at once discontinued, in order to prevent the destructive effect of excessive oxidation. The crystalline pulp is then quickly filtered, pressed, and dissolved in warm water of about 50° centigrade. The aqueous solution is acidulated with a slight excess of hydrochloric or sulphuric acid, and afterward boiled until the flocculent precipitate of the coloring-matter has assumed a crystalline appearance. The coloring-matter thus obtained is filtered, washed with tepid water, and it may then be dried, or, by preference, be left in the state of a paste suitable for dyeing and printing.

Galloflavine prepared as hereinbefore described is an organic acid capable of combining with salifiable bases. In the dry state it has the appearance of a pale chrystalline powder, possessing a silky luster and somewhat resembling ellagic acid, from which it can be readily distinguished by its coloring properties. Moreover, galloflavine does not exhibit the characteristic red-color reaction of ellagic acid upon being treated with a mixture of nitrous and nitric acids.

My yellow coloring-matter is almost insoluble in cold water and sparingly soluble in boiling water. It dissolves in rectified sulphuric acid with a yellowish-green color, and is readily soluble in solutions of caustic and carbonated alkalies.

When galloflavine is dissolved in solution of caustic or carbonated alkalies, alkaline salts are produced which contain an excess of base, and which are liable to undergo decomposition upon exposure to the air.

Galloflavine combines with metallic oxides, thus forming yellow lakes or pigment colors, varying from a greenish to an orange yellow. It can be fixed upon textile fibers by means of alumina, chrome, tin, &c., mordants in a similar manner as artificial alizarine. The chrome-lake fixed upon cotton is particularly distinguished by its resistance against the action of soap, light, and air.

What I claim as new, and desire to secure by Letters Patent, is—

The yellow dye-stuff or coloring-matter hereinbefore described and having the characteristics above set forth.

In testimony whereof I have hereunto set my hand in the presence of two subscribing witnesses.

RENÉ BOHN.

Witnesses:
 HY. SCHAEPPI,
 CHAS. GUIDO KINGE.